United States Patent
Kim

(10) Patent No.: US 7,321,487 B2
(45) Date of Patent: Jan. 22, 2008

(54) PLASMA DISPLAY APPARATUS

(75) Inventor: Sok-San Kim, Cheonan-si (KR)

(73) Assignee: Samsung SDI Co., Ltd., Suwon (KR)

( * ) Notice: Subject to any disclaimer, the term of this patent is extended or adjusted under 35 U.S.C. 154(b) by 251 days.

(21) Appl. No.: 11/054,941

(22) Filed: Feb. 11, 2005

(65) Prior Publication Data
US 2005/0180098 A1    Aug. 18, 2005

(30) Foreign Application Priority Data
Feb. 18, 2004 (KR) ............. 10-2004-0010667

(51) Int. Cl.
*H05K 5/00* (2006.01)
(52) U.S. Cl. ............... 361/681; 349/58; 349/60
(58) Field of Classification Search ........... 361/681; 349/58, 60
See application file for complete search history.

(56) References Cited

U.S. PATENT DOCUMENTS

| | | | |
|---|---|---|---|
| 6,411,501 B1* | 6/2002 | Cho et al. | 361/681 |
| 6,545,733 B2* | 4/2003 | Kaga et al. | 349/58 |
| 6,688,576 B2* | 2/2004 | Oishi et al. | 248/317 |
| 7,006,167 B2* | 2/2006 | Kashimoto | 349/58 |
| 2003/0122992 A1* | 7/2003 | Hayashimoto et al. | 349/58 |

FOREIGN PATENT DOCUMENTS

| | | |
|---|---|---|
| JP | 2001-337611 | 12/2001 |
| JP | 2003-029643 | 1/2003 |

* cited by examiner

Primary Examiner—Jayprakash Gandhi
Assistant Examiner—Ingrid Wright
(74) Attorney, Agent, or Firm—H.C. Park & Associates, PLC

(57) ABSTRACT

A plasma display apparatus including a display panel, a chassis base coupled to a rear of the display panel, and a reinforcement member. The reinforcement member includes a base portion coupled to the chassis base and an extended portion bent from the base portion. A cross-sectional thickness of the extended portion is different from a cross-sectional thickness of the base portion.

14 Claims, 3 Drawing Sheets

PLASMA DISPLAY APPARATUS

CROSS REFERENCE TO RELATED APPLICATION

This application claims priority to and the benefit of Korean Patent Application No. 10-2004-0010667, filed on Feb. 18, 2004, which is hereby incorporated by reference for all purposes as if fully set forth herein.

BACKGROUND OF THE INVENTION

1. Field of the Invention

The present invention relates to a plasma display apparatus, and more particularly, to a plasma display apparatus having a reinforcement member installed on a chassis base.

2. Description of the Background

Generally, a plasma display apparatus is a flat panel display apparatus. Its is display panel forms an image using light emitted by ultraviolet rays generated by a gas discharge in a discharge space. The plasma display apparatus may be a few centimeters thick, and it may have a large screen and a wide view-angle of about 150° or more.

To manufacture a plasma display apparatus, a front panel and a rear panel may be joined together, a chassis base may be coupled to the rear of the combined panel, and a circuit board may be mounted on the chassis base.

Since the chassis base emits heat generated in the panel and supports the panel, it is typically made of a metal, such as aluminum, having high thermal conductivity.

The chassis base should be thin in order to obtain a thinner plasma display apparatus. However, if thinly made, it may not properly support the panel. Thus, reinforcement members may be installed on a rear side of the chassis base to prevent it from twisting or bending.

Multiple reinforcement members may be installed on the rear side of the chassis base. However, the reinforcement members share limited space on the rear of the chassis with other components, such as circuit boards. Therefore, having too many reinforcement members may add difficulties to the design and manufacturing processes, as well as increase costs.

Accordingly, reinforcement members should be optimally designed so that they may be appropriately installed in the limited space available on the chassis base.

SUMMARY OF THE INVENTION

The present invention provides reinforcement members of a plasma display apparatus that may provide stronger reinforcement with fewer members, thereby reducing the apparatus' manufacturing costs.

Additional features of the invention will be set forth in the description which follows, and in part will be apparent from the description, or may be learned by practice of the invention.

The present invention discloses a plasma display apparatus comprising a display panel, a chassis base coupled to a rear of the display panel, and a reinforcement member. The reinforcement member includes a base portion coupled to the chassis base and and an extended portion bent from the base portion. A cross-sectional thickness of the extended portion is different from a cross-sectional thickness of the base portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
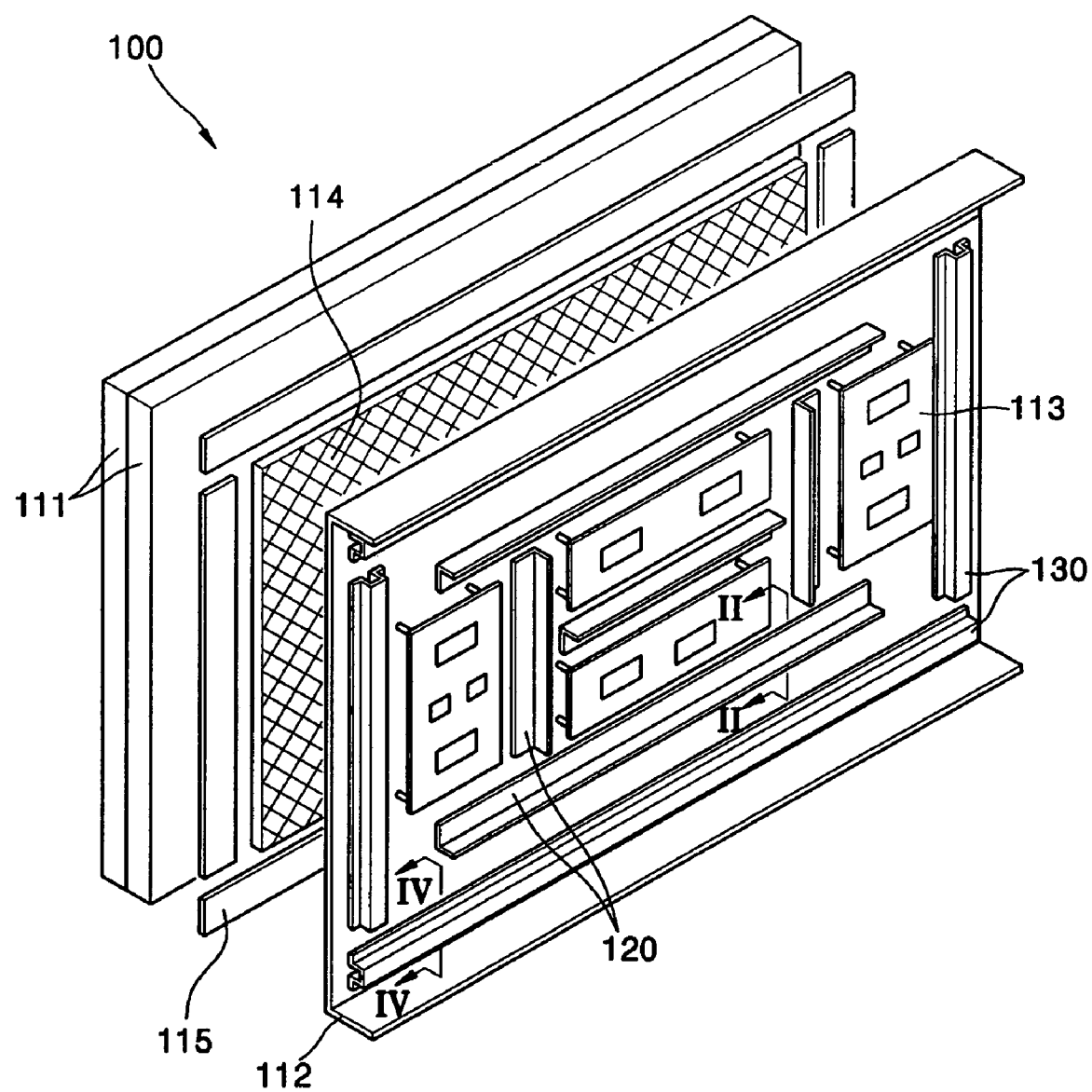
FIG. 1 is an exploded perspective view showing a plasma display apparatus according to an exemplary embodiment of the present invention.

FIG. 1 is an exploded perspective view showing a plasma display apparatus according to an exemplary embodiment of the present invention. Referring to FIG. 1, a plasma display apparatus 100 may include a panel 111, a chassis base 112 coupled to the panel 111, and a circuit board 113 installed on a rear side of the chassis base 112.

The panel 111 comprises a front panel and a rear panel. The front panel may include a plurality of stripe-shaped sustain electrodes, bus electrodes connected to each sustain electrode, a front dielectric layer covering the sustain electrodes and the bus electrodes, and a protective layer covering the front dielectric layer.

The rear panel faces the front panel, and it may include a plurality of address electrodes arranged perpendicularly to the sustain electrodes, a rear dielectric layer covering the address electrodes, barrier ribs formed on the rear dielectric layer to define a discharge space and prevent cross-talk, and red, green, and blue phosphor layers coated on the rear dielectric layer and sides of the barrier ribs. An electromagnetic interference filter may be installed on the entire surface of the panel 111 to prevent electromagnetic waves from harming viewers.

The chassis base 112 may be disposed at the rear of the panel 111 to support the panel and emit heat transferred from it.

An adhesive member 115, such as double sided tape, may couple the panel 111 to the chassis base 112. A panel heat-dissipation member 114 (i.e. a thermal conductive medium) may be disposed between the panel 111 and the chassis base 112. It dissipates heat generated in the panel 111 via the chassis base 112.

The circuit board 113 may be mounted on the rear of the chassis base 112, and it may accommodate electronic components for driving the panel 111. The electronic components may include a variety of components, such as components for supplying power to the panel and components for applying image-forming signals to the panel. The panel 111, the chassis base 112, and the circuit board 113 may be housed in a case (not shown).

Reinforcement members 120 and 130 may be installed on the rear side of the chassis base 112 to prevent the chassis base 112 from twisting or bending.

In order to increase reinforcement of the chassis base 112, the reinforcement members 120 and 130 may include center reinforcement members 120 installed in the center of the chassis base and side reinforcement members 130 installed at edges of the chassis base.

The center reinforcement members 120 may include a widthwise reinforcement member installed along a width of the chassis base 112 and a lengthwise reinforcement member installed along a length direction of the chassis base 112. Similarly, the side reinforcement members 130 may include a widthwise reinforcement member and a lengthwise reinforcement member. As described above, the circuit board 113 may be disposed on the rear side of the chassis base 112 and in a space between the reinforcement members 120 and 130.

The reinforcement members 120 and 130 may be disposed symmetrically with the rear side of the chassis base 112 to more uniformly distribute stress occurring in the reinforcement members 120 and 130 due to an external force or thermal expansion.

The reinforcement members 120 and 130 may be formed of a stiff material in order to stably support the chassis base 112. Aluminum, steel, or other stiff and workable materials may be used.

The reinforcement members 120 and 130 may have various cross-sectional structures. For example, FIG. 2 shows a cross-sectional structure of the reinforcement members 120 taken along line II-II of FIG. 1.

Figure 2:
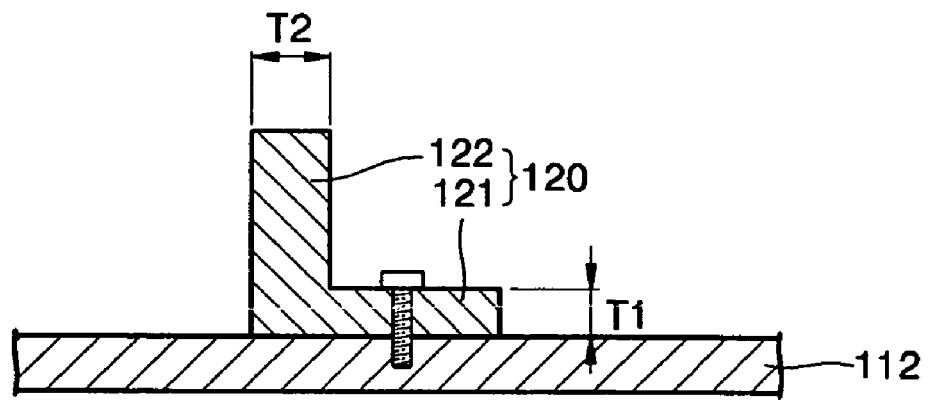
FIG. 2 is a cross-sectional view of a reinforcement member taken along line II-II of FIG. 1.

Referring to FIG. 2, the reinforcement members 120 may include a base portion 121, which may be coupled to the chassis base 112, and and an extended portion 122 that bends from the base portion 121. T1 is a cross-sectional thickness of the base portion 121, T2 is a cross-sectional thickness of the extended portion 122, and T1 is not equal to T2.

Since the cross-sectional thickness T1 of the base portion 121 does not significantly affect chassis base stiffness, unlike the cross-sectional thickness T2 of the extended portion 122, the base portion 121 may be set to be about 0.75 to about 1.5 times the thickness of the chassis base 112.

The cross-sectional thickness T2 of the extended portion 122 may be greater than the cross-sectional thickness T1 of the base portion 121.

As the cross-sectional thickness T2 increases, the weight of the reinforcement members 120 increases. Thus, the ratio of the cross-sectional thickness T2 to the cross-sectional thickness T1 may be in a range of about 1.2 to about 3. Additionally, the reinforcement members 120 may be extrusion molded to form the above-described cross-sectional structure.

As the cross-sectional thickness T2 increases, an area moment of inertia and reinforcement of the chassis base increase, thereby providing a stiffer chassis base 112 and minimizing its twisting and bending.

This effect is shown in Table 1, which shows measured values of chassis base stiffness according to a cross-sectional thickness T2 of an extended portion 122.

The stiffness of the chassis base 112 is defined by dividing deflection of the chassis base by the weight applied to it. Assuming that the stiffness is 100% when T2=T1, Table 1 shows that as T2 increases, the chassis base stiffens.

Figure 3:
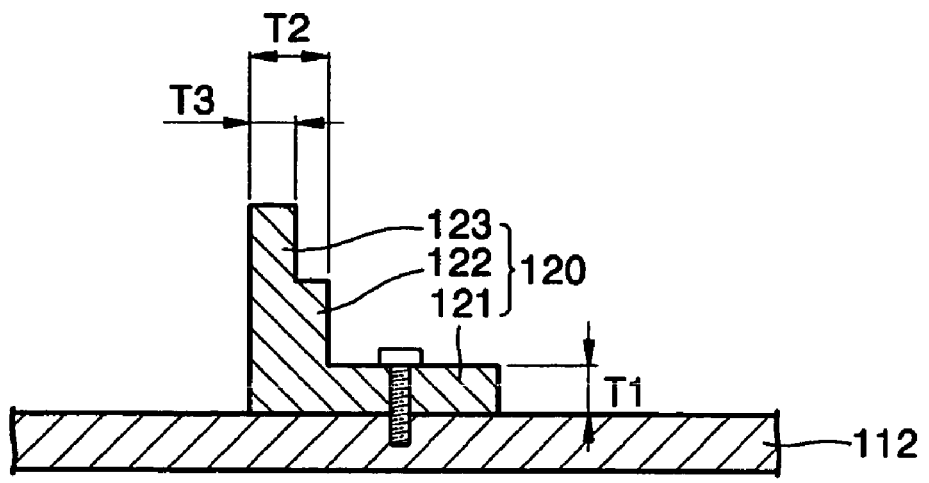
FIG. 3 is a cross-sectional view of another exemplary embodiment of the reinforcement member of FIG. 2.

FIG. 3 shows an alternative cross-sectional structure of the reinforcement members 120.

Referring to FIG. 3, a stepped portion 123 may be formed in the extended portion 122 of the reinforcement members 120. FIG. 3 shows a cross-sectional thickness T3 of the stepped portion 123 as less than the cross-sectional thickness T2 of the extended portion 122. However, T3 may be greater than T2.

The stepped portion 123 may be formed in a portion of the extended portion 122, and the ratio of the cross-sectional thickness T2 to the cross-sectional thickness T3 may be in a range of about 0.8 to about 2.

Figure 4:
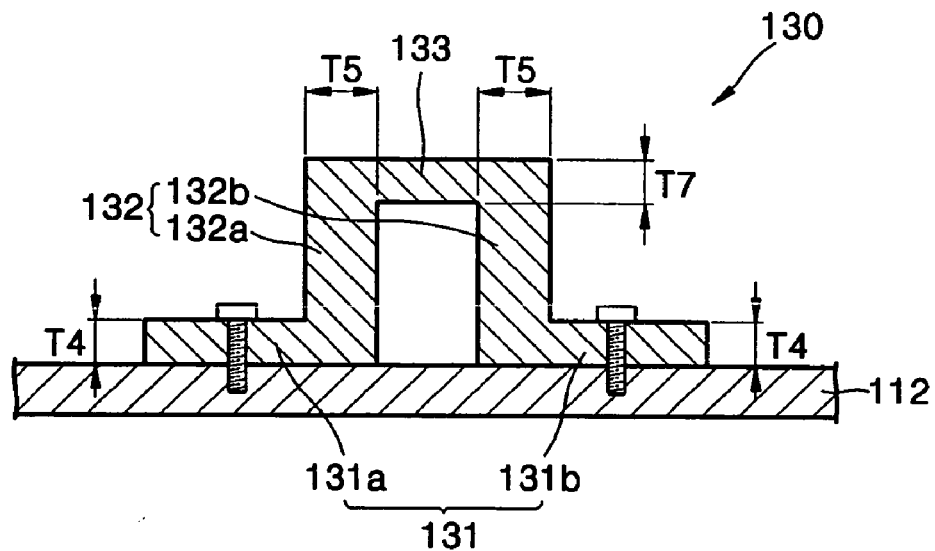
FIG. 4 is a cross-sectional view of a reinforcement member taken along line IV-IV of FIG. 1.

FIG. 4 is a cross-sectional view of the reinforcement member 130 taken along line IV-IV of FIG. 1.

Referring to FIG. 4, a reinforcement member 130 may include a base portion 131, an extended portion 132, and a connection portion 133. The base portion 131 may include first and second base portions 131a and 131b, separated from each other by a gap, and coupled to the chassis base 112. The extended portion 132 may include first and second extended portions 132a and 132b, which may be bent from the first and second base portions 131a and 131b, respectively, and the connection portion 133 connects the first and second extended portions 132a and 132b.

T4 is a cross-sectional thickness of the first and second base portions 131a and 131b, T5 is a cross-sectional thickness of the first and second extended portions 132a and 132b, and T4 is not equal to T5.

Similar to the previous exemplary embodiment, the cross-sectional thickness T4 of the first and second base portions 131a and 131b may be in a range of about 0.75 to about 1.5 times the thickness of the chassis base 112.

The cross-sectional thickness T5 may be greater than the cross-sectional thickness T4. Additionally, a cross-sectional thickness T7 of the connection portion 133 may be equal to or approximately equal to the cross-sectional thickness T4 of the first and second base portions 131a and 131b.

As the cross-sectional thickness T5 increases, the weight of the reinforcement member 130 increases. Hence, the ratio of the cross-sectional thickness T5 to the cross-sectional thickness T4 (i.e. T5/T4) may be in a range of about 1.2 to about 3. Additionally, the reinforcement members 130 may be extrusion molded to form the above-described cross-sectional structure.

As the cross-sectional thickness T5 increases, an area moment of inertia and reinforcement of the chassis base increase, thereby stiffening the panel and minimizing its twisting and bending.

Figure 5:
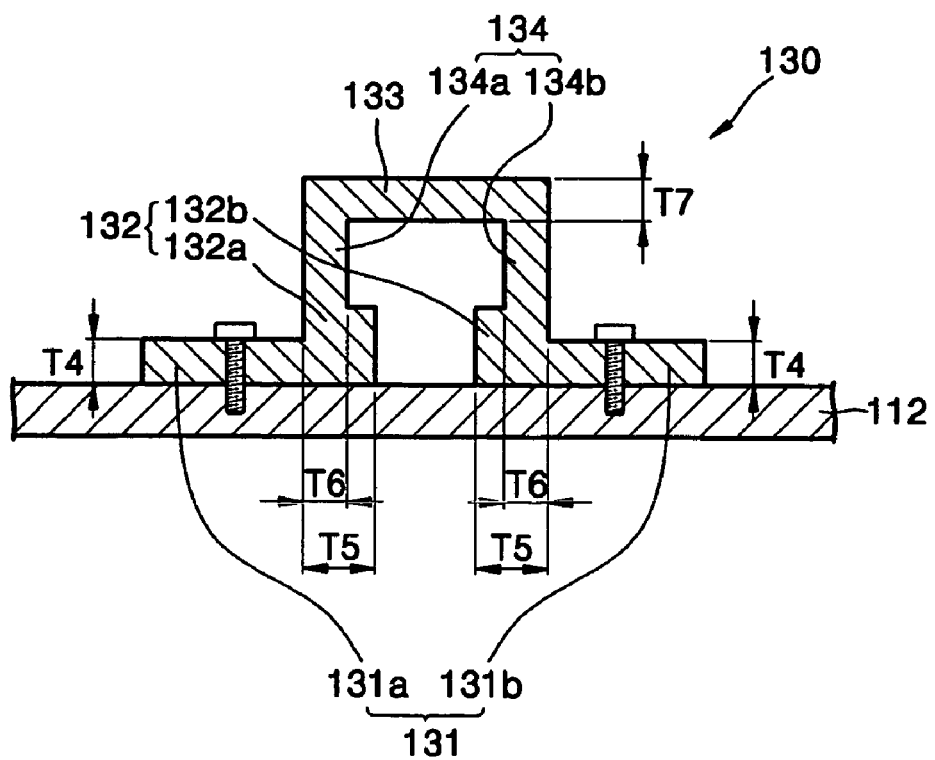
FIG. 5 is a cross-sectional view of another exemplary embodiment of the reinforcement member of FIG. 4.

FIG. 5 shows an alternative cross-sectional structure of the reinforcement member 130.

Referring to FIG. 5, a stepped portion 134 may be formed in the extended portion 132 of the reinforcement members 130. In other words, first and second stepped portions 134a and 134b may be formed in the first and second extended portions 132a and 132b. FIG. 5 shows the cross-sectional thickness T5 of the first and second extended portions 132a and 132b as greater than the cross-sectional thickness T6 of the first and second stepped portions 134a and 134b. However, the thickness T6 of the first and second stepped portions 134a and 134b may be greater than the thickness T5 of each of the first and second extended portions 132a and 132b.

TABLE 1

| T1 (mm) | T2 (mm) | Stiffness (%) |
| --- | --- | --- |
| 1.6 | 1.6 | 100 |
| 1.6 | 2.0 | 110 |
| 1.6 | 2.5 | 119 |
| 1.6 | 3.0 | 126 |
| 1.6 | 3.2 | 129 |
| 1.6 | 3.5 | 131 |

The first and second stepped portions 134a and 134b may be formed in portions of the first and second extended portions 132a and 132b, and the ratio of the cross-sectional thickness T5 of the first and second extended portions 132a and 132b to the cross-sectional thickness T6 of the first and second stepped portions 134a and 134b may be in a range of about 0.8 to about 2.

As described above, in the plasma display apparatus according to exemplary embodiments of the present invention, a reinforcement member may have a cross-sectional structure with an increased area moment of inertia, thereby stiffening a chassis base and minimizing twisting and deflection of the chassis base. A proper number of reinforcement members may be installed to maximize the reinforcement of the chassis base. Further, the reinforcement members may be installed in an appropriate place on the chassis base, thereby is increasing utility of the space on the rear side of the chassis base. Additionally, manufacturing costs of the chassis base may be reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A plasma display apparatus, comprising:
   a display panel;
   a chassis base comprising a first side and a second side, the first side being coupled to a rear of the display panel;
   at least one driving circuit board coupled to the second side of the chassis base; and
   a reinforcement member,
   wherein the reinforcement member comprises:
      a base portion coupled to the second side of the chassis base; and
      an extended portion bent from the base portion,
   wherein a cross-sectional thickness of the extended portion is different from a cross-sectional thickness of the base portion.

2. The plasma display apparatus of claim 1,
   wherein the cross-sectional thickness of the base portion is T1;
   wherein the cross-sectional thickness of the extended portion is T2; and
   wherein a ratio of T2 to T1 is in a range of about 1.2 to about 3.

3. The plasma display apparatus of claim 2, wherein a ratio of T1 to a thickness of the chassis base is in a range of about 0.75 to about 1.5.

4. The plasma display apparatus of claim 2, wherein the reinforcement member further comprises a stepped portion formed in the extended portion.

5. The plasma display apparatus of claim 4, wherein a cross-sectional thickness of the stepped portion is T3; and wherein a ratio of T2 to T3 is in a range of about 0.8 to about 2.

6. The plasma display apparatus of claim 1,
   wherein the reinforcement member further comprises a connection portion;
   wherein the base portion includes a first base portion and a second base portion separated from each other by a gap;
   wherein the extended portion includes a first extended portion and a second extended portion bent from the first base portion and the second base portion, respectively; and
   wherein the connection portion couples the first extended portion and the second extended portion.

7. The plasma display apparatus of claim 6,
   wherein a cross-sectional thickness of the base portion is T4;
   wherein a cross-sectional thickness of the extended portion is T5; and
   wherein a ratio of T5 to T4 is in a range of about 1.2 to about 3.

8. The plasma display apparatus of claim 7, wherein the reinforcement member further comprises a stepped portion formed in at least one of the first extended portion and the second extended portion.

9. The plasma display apparatus of claim 8,
   wherein a cross-sectional thickness of the stepped portion is T6; and
   wherein a ratio of T5 to T6 is in a range of about 0.8 to about 2.

10. The plasma display apparatus of claim 6, wherein a cross-sectional thickness of the base portion and a cross-sectional thickness of the connection portion are equal to each other.

11. The plasma display apparatus of claim 1, wherein the reinforcement member is extrusion molded.

12. The plasma display apparatus of claim 1, wherein the reinforcement member includes a side reinforcement member formed at edges of the chassis base.

13. The plasma display apparatus of claim 12, wherein the reinforcement member further includes a center reinforcement member installed at a center of the chassis base.

14. The plasma display apparatus of claim 1, wherein the base portion and the extended portion form a substantially right angle.

* * * * *